Oct. 9, 1934.   E. A. HARTY   1,976,556
METHOD OF TREATING DRY RECTIFIERS
Filed Feb. 6, 1932
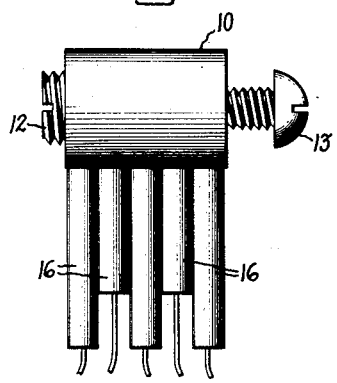
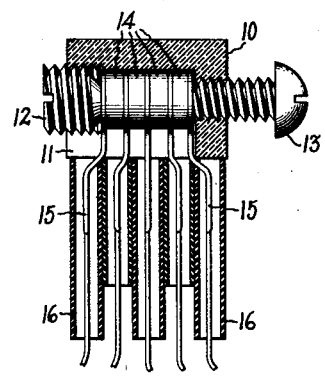
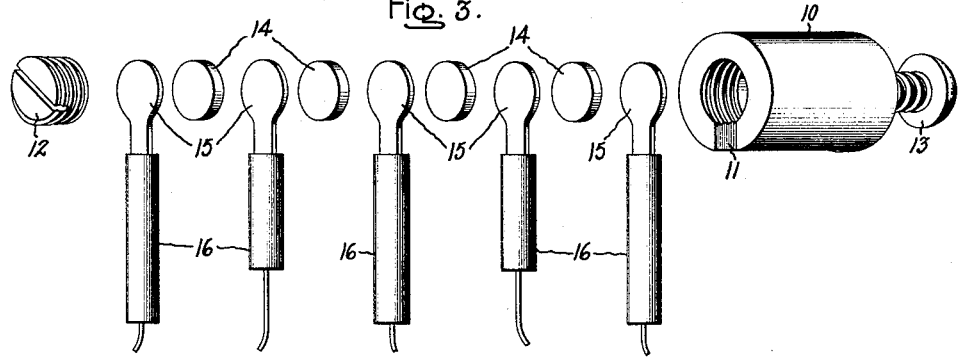
Inventor:
Edgar A. Harty,
by Charles E. Mullen
His Attorney.

Patented Oct. 9, 1934

1,976,556

UNITED STATES PATENT OFFICE 1,976,556

METHOD OF TREATING DRY RECTIFIERS

Edgar A. Harty, Marblehead, Mass., assignor to General Electric Company, a corporation of New York Application February 6, 1932, Serial No. 591,354

16 Claims. (Cl. 175—366)

My invention relates to the rectification of alternating current, and has for its principal object the provision of an improved alternating current rectifier which may be used where small amounts of rectified current are required, such as in the circuits of alternating current meters or the like.

This application is a continuation in part of my copending application Serial No. 384,449, filed August 8, 1929 and assigned to the same assignee as the present application. The present application is directed particularly to an improved method of treating the active elements of rectifiers such as disclosed in the above copending application.

Various types of devices for converting alternating current into direct current have been provided in the past. Some of these devices include a pair of solid electrodes which are made of different materials and are mounted in juxtaposition to one another. The useful life of such rectifiers is dependent on the materials entering into the composition of electrodes. Various electrode materials have been used. For example, Polowski Patent 830,924 discloses a rectifier which includes an electrode of aluminum and an electrode of cuprous sulphide, Garretson Patent 929,582 discloses a rectifier including an electrode of silver sulphide and an electrode consisting of a metallic oxide, and Grondahl Patent 1,640,335 discloses a rectifier consisting of copper and copper oxide.

Each of the rectifying devices disclosed by these patents includes solid electrodes, one of which is a relatively good electrical conductor and the other of which is a relatively poor electrical conductor. The relatively highly conductive electrode, which acts as the cathode, is electro-positive to the other, or compound, electrode. In the operation of the device electrons pass readily within the rectifier cell from the electro-positive electrode to the electro-negative electrode, but pass only with great difficulty in the opposite direction.

My invention relates particularly to a rectifier of the copper oxide type. The theory on which the operation of the copper oxide rectifier is based is not well understood, but it is supposed by some authorities that the orbits of the electrons in the electro-negative or copper electrode are relatively large and that the orbits of the electrons in the electro-positive or copper oxide electrode are relatively small, and that, under these conditions, the electrons readily pass from the copper electrode when this electrode is negatively charged, but do not readily pass in the opposite direction when the polarity is reversed. Regardless of whether or not this is the correct theory, it is well known that when an alternating voltage is applied to a circuit including electrodes of copper and copper oxide, an electric current passes readily in one direction and not at all or with great difficulty in the opposite direction.

My invention will be better understood from the following description when considered in connection with the accompanying drawing and its scope will be pointed out in the appended claims.

Referring to the drawing, Fig. 1 is a plan view of a rectifier wherein my invention has been embodied; Fig. 2 is a sectional view of this rectifier, and Fig. 3 is an exploded view showing the arrangement of the various parts of the device.

As indicated by these figures, the rectifier includes a hollow cylindrical casing 10 of insulating material which is provided with a slot 11 at one of its sides and is threaded at opposite ends to receive the threaded members 12 and 13. Interposed between the threaded members are a plurality of rectifying elements 14 of the copper oxide type and each consisting of a copper plate having a coating thereon of cuprous oxide. Interposed between members 14 are a plurality of electrically conductive elements 15 which are provided with terminals extending through the slot 11. These terminals are surrounded by insulation collars 16 which extend into the slot. The conductive members 15 may be made of lead or any other suitable conducting material which insures good electrical contact between the different rectifying elements 14. The threaded or adjustable members 12 and 13 are provided for holding the members 14 and 15 in good contact with one another and may be adjusted to apply any suitable pressure to these members. The insulation collars 16 function to prevent contact between the terminals of the conductive members 15.

The illustrated embodiment of the invention was devised particularly for use in connection with alternating current meters but is suitable for use wherever a rectifier of small dimensions and small current capacity is required. As illustrated in the drawing, the device is from three to four times as large as the actual device.

In the use of the device the alternating current circuit may be connected to intermediate terminal member 15 while the direct current meter circuit may be connected between the center terminal member 15 and the two outer terminals 15. Under these conditions both half cycles of the alternating current are rectified, the return circuit from the direct current load being through the center contact terminal 15.

As will be readily understood by those skilled in the art, the illustrated modification of the invention has the advantage that it is easy to assemble, is compact, and avoids the necessity of soldering the leads to the rectifying elements of the device. The device has been found very satisfactory in service and is comparatively inexpensive to manufacture.

In the manufacture of the copper oxide rectifier such as described herein, when the rectifying elements 14 have been treated to form on the copper surface thereof a layer of red cuprous oxide they are usually found to have also an outer coating of black cupric oxide. The cupric oxide is a high resistance material and undesirable in a device of this character. It has been customary to remove the undesirable black cupric oxide by the action of sodium cyanide. The use of sodium cyanide for the purpose, however, has not been altogether satisfactory for the reason that an undue proportion of the elements thus treated show high leakage or reverse current.

Further it has been customary in the past to reject and to scrap all rectifier elements such as elements 14 which showed high leakage or reverse current. This rejected or scrap material in certain cases amounted to a considerable percentage of the finished product.

I have discovered, however, a means of treating the rectifier elements to remove the black cupric oxide, whereby the finished elements show substantially less leakage or reverse current than when treated with sodium cyanide, and a means whereby all or a large proportion of the above mentioned rejected or scrapped elements may be salvaged without appreciable cost.

In accordance with my invention the newly formed rectifier elements having black cupric oxide thereon, or those finished rectifier elements which show a high reverse or leakage current, are immersed in a solution of fifty parts water fifty parts glacial acetic acid, or acetic anhydride containing a small quantity of copper acetate in solution. The elements are allowed to remain in this bath for periods varying from eight to fifty hours or more. Best results are had when the acetic acid solution is hot, the maximum effect being obtained when the solution is maintained at the boiling point and in this latter case the period of treatment may be very greatly shortened and may be in the order of twenty-five minutes.

After removal from the solution those elements which have been treated for removal of the black cupric oxide layer show a marked decrease in leakage over similar elements treated with sodium cyanide, and in those elements which have been rejected because of high leakage the leakage is reduced to such an extent that practically all such rejected elements may be salvaged. The leakage of rejected elements after treatment in certain cases is reduced to as small an amount as only five or six per cent of the leakage before treatment.

I believe that the improved results obtained by the process herein described in accordance with my invention may be explained by the assumption that the action of the cyanide heretofore employed at times is too severe causing the oxide to crack on the edges of the element and thereby increasing the leakage due to the so-called edge effect. The acetic acid treatment, on the contrary, is very gradual and practically eliminates the edge effect condition as the acetic acid heals the broken crystals on the edge instead of breaking them as in the case of the cyanide treatment.

I have described my improved process of treating the elements of rectifiers to reduce the leakage or reverse current as particularly essential and advantageous when applied to the extremely small current rectifier which forms the subject matter of the above mentioned copending application Serial No. 384,449. The treatment of the rectifying elements with acetic acid as described herein makes easily possible the manufacture of a rectifier which operates on a very low voltage, of the order of one volt or less, and which nevertheless is of high efficiency. It will be readily understood, however, that the process of treating the rectifier elements by immersion in a solution containing acetic acid may be applied not only to the small rectifier, described in the above copending application and adapted to use where small amounts of current are required such as in the circuits of alternating current meters or the like, but may be applied with advantage to rectifiers of other sizes and types as well.

What I claim as new and desire to secure by Letters Patent of the United States, is:

1. The method of producing a rectifying element for copper oxide rectifiers which includes treating said element with acetic acid for a period of time sufficient to cause the leakage current of said rectifying element to be of a relatively low range of values.

2. The method of producing a rectifying element for copper oxide rectifiers which includes treating said element with acetic acid from eight to fifty hours.

3. The method of producing a rectifying element for copper oxide rectifiers which includes treating said element with a solution of water and glacial acetic acid for a period of time sufficient to cause the leakage current of said rectifying element to be of a relatively low range of values.

4. The method of producing a rectifying element for copper oxide rectifiers which includes treating said element with a solution containing acetic acid for a period of time sufficient to cause the leakage current of said rectifying element to be of a relatively low range of values.

5. The method of producing a rectifying element for copper oxide rectifiers which includes immersing said element in a solution of water, acetic acid and a small quantity of copper acetate for a period of time sufficient to cause the leakage current of said rectifying element to be of a relatively low range of values.

6. The method of producing a rectifying element for copper oxide rectifiers which includes immersing said element in a solution of fifty parts water to fifty parts of glacial acetic acid containing a small quantity of copper acetate in solution for a period of time sufficient to cause the leakage current of said rectifying element to be of a relatively low range of values.

7. The method of producing a rectifying element for copper oxide rectifiers which includes treating said element with acetic acid for a period of time sufficient to remove the layer of black cupric oxide from said element.

8. The method of producing a rectifying element for copper oxide rectifiers which includes treating said element with a solution of water and glacial acetic acid for a period of time sufficient to remove the black cupric oxide layer from said element.

9. The method of producing a rectifying element for copper oxide rectifiers which includes treating said element with a solution containing acetic acid for a period of time sufficient to remove the black cupric oxide layer from said element.

10. The method of producing a rectifying element for copper oxide rectifiers which includes immersing said element in a solution of water, acetic acid and a small quantity of copper acetate for a period of time sufficient to remove the black cupric oxide layer from said element.

11. The method of producing a rectifying element for copper oxide rectifiers which includes immersing said element in a solution of fifty parts water to fifty parts glacial acetic acid containing a small quantity of copper acetate in solution for a period of time sufficient to remove the black cupric oxide layer from said element.

12. The method of producing a rectifying element for copper oxide rectifiers which includes treating said element with acetic acid for a period of time of the order of twenty-five minutes when the acid is maintained hot.

13. The method of producing a rectifying element for copper oxide rectifiers which includes treating said element with a solution of water and glacial acetic acid for periods of time varying from approximately twenty-five minutes when the solution is maintained hot to periods from eight to fifty hours when the solution is maintained cold.

14. The method of producing a rectifying element for copper oxide rectifiers which includes treating said element with a solution containing acetic acid for periods of time varying from a period of the order of twenty-five minutes when the solution is maintained hot to periods from eight to fifty hours when the solution is maintained cold.

15. The method of producing a rectifying element for copper oxide rectifiers which includes immersing said element in a solution of water, acetic acid and a small quantity of copper acetate for periods of time varying from a period of the order of twenty-five minutes when the solution is maintained hot to periods from eight to fifty hours when the solution is maintained cold.

16. The method of producing rectifying elements for copper oxide rectifiers which includes treating said elements with acetic acid for a period of time sufficient to reduce substantially the proportion of said treated elements rejected by reason of being characterized by leakage current above a predetermined value.

EDGAR A. HARTY.